July 27, 1965 M. SAPOFF ETAL 3,197,725
BEAD TYPE THERMISTORS
Original Filed Sept. 5, 1961

PLATINUM-IRIDIUM    DIFFUSED GOLD

INVENTOR.
MEYER SAPOFF
BY JOHN GECSEY
Albert F. Kronman
ATTORNEY

United States Patent Office 3,197,725
Patented July 27, 1965

3,197,725
BEAD TYPE THERMISTORS
Meyer Sapoff, West Orange, and John Gecsey, Rahway, N.J., assignors to Victory Engineering Corporation, Union, N.J., a corporation of Delaware
Original application Sept. 5, 1961, Ser. No. 136,019. Divided and this application Sept. 19, 1962, Ser. No. 224,664
1 Claim. (Cl. 338—22)

This invention relates to thermistors and methods of manufacturing thermistors having a pair of conductors each of which includes a core of an alloy of platinum-iridium and a covering on the core which can easily be soldered to other conductors and is a division of an application for patent filed September 5, 1961, Serial No. 136,019, in the name of Meyer Sapoff and John Gecsey.

During the manufacture of thermistors it is necessary to raise the temperature of the thermistors bead and its two conductors to at least 1,000 degrees centigrade and maintain this temperature for a short time interval while the bead is being sintered. The beads are then heated again from 700 to 900 degrees centigrade for glazing purposes. These high temperatures cause the iridium in the wire conductors to be oxidized and thereafter resist soldering to other conductors. No efficient flux is known which can be used for soldering oxidized iridium. It is the purpose of this invention to coat the wire conductors with a thin covering of a noble metal which can be diffused into the surface of the platinum-iridium and thereby form a covering which resists high temperatures and still may be soldered to components of other circuits.

An object of the present invention is to provide an improved thermistor which avoids one or more of the disadvantages and limitations of prior art thermistors.

Another object of the present invention is to provide a pair of thermistor conductors which can withstand temperatures of 1500 degrees C. during a sintering operation and be capable of soldering to an external circuit when the thermistor is finished.

A further object of the present invention is to simplify the construction of thermistors.

Another object of the present invention is to increase the usefulness of thermistors as circuit components.

Another object of the present invention is to form a more perfect hermetic seal between the thermistor glass covering and the conductors.

The invention comprises a thermistor and the method of making it. The thermistor includes a bead of powdered calcined metal oxides held together by a binder. A covering of glass surrounds the bead and two conductors are embedded in the bead for connection to an external operating circuit. Each of the conductors include a central core of an alloy of platinum and iridium and a covering of gold which has been diffused into the surface of the alloy by the application of heat. The gold may be diffused by heat into the surface before the thermistor beads are applied to the conductors.

In the accompanying drawings, forming a part hereof, there is illustrated one form of the invention in which drawings similar reference characters designate corresponding parts, and in which.

Figure 1:
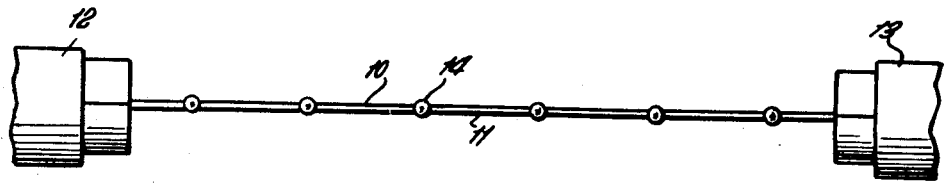
FIGURE 1 is a plan view illustrating how the thermisters are first assembled.
Figure 2:
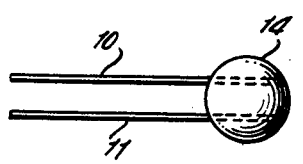
FIGURE 2 is a view of a finished thermistor including two conductors parallel to each other protruding from one side of the thermistor bead.
Figure 3:
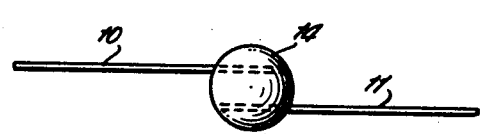
FIGURE 3 is a view showing a thermistor with the conductors protruding from opposite sides of the thermistor bead.

Referring to the drawings, two wires 10 and 11 are stretched between two end clamps 12 and 13. The wires may be very fine and in most cases have a diameter which is less than 0.005 of an inch. In order for such fine wires to withstand a moderate degree of stretching they are generally made of an alloy of platinum and iridium, the iridium accounting for considerable strength. For the purpose of forming a covering which will withstand considerable heat and yet be solderable after the thermistor is finished, a non-oxidizing noble metal such as gold is plated onto the conductors.

A plurality of beads 14 are now placed on the wires in spaced relation as indicated in FIGURE 1. The application may be made by manual means or by the use of a mold. When applied, the beads consist of a slurry or ceramic-like material, such as calcined metallic oxide mixed with a suitable binder. When the beads are quite small they assume a geometric form which approximates a spheroid and completely enclose both wires 10 and 11. The beads are allowed to dry and then the entire assembly is placed in a furnace and sintered at a temperature which may range from 1,000 to 1500 degrees centigrade. The wires are then cut so that each bead is separated from the other beads and contains two conductors which may protrude from one side of the bead adjacent to each other. Alternately, the conductors may protrude from opposite sides of the bead. During the heating cycle the ceramic beads are formed into a single hard ceramic component because the binder has been melted and solidified around the oxide particles. At the same time, the gold covering on the surface of the wires is diffused into the outside surface of the alloy material and forms an alloy surface which is particularly resistant to subsequent heating. This surface will also accept solder when ordinary soldering fluxes are used.

The beads are now hermetically sealed in a glass covering. This seal may be applied by the application of a slurry of powdered glass with or without a binder and then heated to a temperature which may range from 700 to 900° C. The result is a glass covering which may vary in thickness from .001 to .029 inch.

The application of the two cycles to the thermistor would oxidize the iridium in the conductors if the conductors were not protected. An oxide layer of iridium cannot be soldered by commercial solders and the application of solder to the wires is prevented even when special fluxes are employed. However, when the gold diffused covering is applied to the wires they can be easily soldered by commercial solders and ordinary fluxes.

It has been found that the use of gold diffused surfacing on the conductors permits a tighter glass-to-metal seal to be made. The glass covering protects the bead from humidity and other gasses in the atmosphere and a tight seal around the conductors where they enter the bead helps to maintain the protective covering. It is apparent that the glass wets the gold-diffused surface and thereby forms a seal which is practically vacuum tight.

Figure 4:
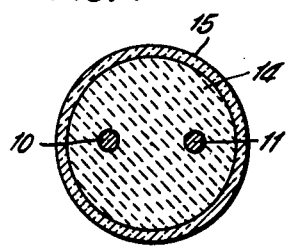
FIGURE 4 is a cross-sectional view of a thermistor bead showing the glass covering.
Figure 5:
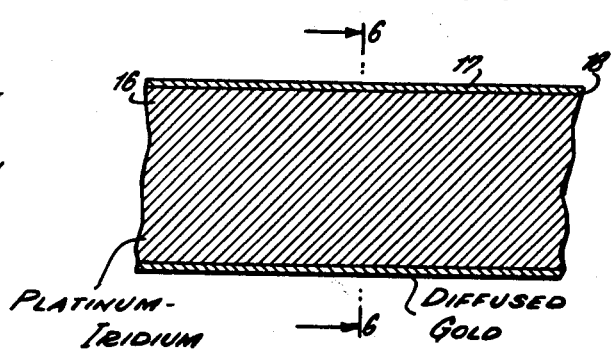
FIGURE 5 is a cross-sectional view, greatly enlarged, of one of the conductors used with the bead and shows a covering of a solderable metal.
Figure 6:
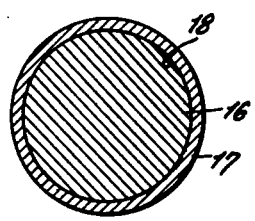
FIGURE 6 is a cross-sectional view of the conductors shown in FIGURE 5 and is taken along line 6—6 of that figure.

FIGURE 4 shows a cross-sectional view of the bead with the ceramic material 14 surrounded by a thin glass shell 15. FIGURE 5 shows a cross-sectional view of one of the conductors with a platinum-iridium core 18 and a surface covering of gold 17 which diffuses to the alloy at the interface 18. A cross-section of this wire taken along line 6—6 is shown in FIGURE 5.

Having thus fully described the invention what is claimed as new and desired to be secured by Letters Patent of the United States, is:

A thermistor comprising at least two platinum and iridium alloy conductors, a covering of gold diffused into the entire surface of said conductors, a bead of calcined metal oxides on a portion of the covered conductors and a covering of glass around the bead and in hermetic contact with the diffused gold surface of the conductors.

References Cited by the Examiner

UNITED STATES PATENTS

| | | | |
|---|---|---|---|
| 1,261,110 | 4/18 | Fahrenwald | 117—52 |
| 2,332,596 | 10/43 | Pearson | 338—23 |
| 2,352,056 | 6/44 | Wilson | 338—22 |
| 2,395,759 | 2/46 | Priessman | 338—22 |
| 2,421,759 | 6/47 | Pearson | 338—22 |
| 2,505,066 | 4/50 | Rulison | 338—22 X |
| 2,700,720 | 1/55 | Torok | 338—22 |
| 2,735,907 | 2/56 | Inman | 200—166 X |
| 2,863,977 | 12/58 | Horwitt | 219—267 |
| 3,068,438 | 12/62 | Rollin | 338—22 |
| 3,110,875 | 11/63 | Sapoff et al. | 338—22 |

OTHER REFERENCES

C. A. Montgomery's "Technique of Microwave Measurements," 1947, 1st edition, pages 89–104, 184, 703, 891.

RICHARD M. WOOD, *Primary Examiner*.